(12) United States Patent
Mitsuhashi et al.

(10) Patent No.: US 7,998,565 B2
(45) Date of Patent: Aug. 16, 2011

(54) BINDER FOR GLASS CHOPPED STRAND MATS

(75) Inventors: Hirokazu Mitsuhashi, Kyoto (JP); Yoshimitsu Sugiyama, Kyoto (JP); Seiji Horie, Kyoto (JP)

(73) Assignee: Sanyo Chemical Industries, Ltd., Kyoto-shi (JP)

( * ) Notice: Subject to any disclaimer, the term of this patent is extended or adjusted under 35 U.S.C. 154(b) by 0 days.

(21) Appl. No.: 12/933,527

(22) PCT Filed: Feb. 24, 2009

(86) PCT No.: PCT/JP2009/000778
§ 371 (c)(1),
(2), (4) Date: Sep. 20, 2010

(87) PCT Pub. No.: WO2009/122652
PCT Pub. Date: Oct. 8, 2009

(65) Prior Publication Data
US 2011/0020624 A1    Jan. 27, 2011

(30) Foreign Application Priority Data

Mar. 31, 2008 (JP) ................................. 2008-093215
Sep. 30, 2008 (JP) ................................. 2008-254548

(51) Int. Cl.
*A61F 13/15* (2006.01)
(52) U.S. Cl. ........................................ 428/219; 442/180
(58) Field of Classification Search .................. 428/219, 428/297.4, 221; 442/180; 264/109
See application file for complete search history.

(56) References Cited

U.S. PATENT DOCUMENTS

| | | | | |
|---|---|---|---|---|
| 4,006,272 A | * | 2/1977 | Sakaguchi et al. | 442/180 |
| 4,418,113 A | * | 11/1983 | Kawashima et al. | 428/213 |
| 5,047,284 A | * | 9/1991 | Shibuya et al. | 428/32.77 |
| 5,063,103 A | * | 11/1991 | Sugawara et al. | 442/180 |
| 5,489,481 A | * | 2/1996 | Hager et al. | 428/431 |
| 2003/0087078 A1 | * | 5/2003 | Desrosiers et al. | 428/297.4 |
| 2011/0020624 A1 | * | 1/2011 | Mitsuhashi et al. | 428/219 |

FOREIGN PATENT DOCUMENTS

| | | |
|---|---|---|
| JP | 2003-048255 A | 2/2003 |
| JP | 2003-127240 A | 5/2003 |
| JP | 2004-263124 A | 9/2004 |
| JP | 2009-074228 A | 4/2009 |

OTHER PUBLICATIONS

International Search Report for PCT/JP2009/000778, mailing date of May 12, 2009.

* cited by examiner

*Primary Examiner* — N. Edwards
(74) *Attorney, Agent, or Firm* — Westerman, Hattori, Daniels & Adrian, LLP

(57) ABSTRACT

A glass chopped strand mat binder according to the invention can be supplied in an amount smaller than a conventional binder amount and can form a glass chopped strand mat having desired uniform strength. The invention is a glass chopped strand mat binder that includes a polyester resin powder (A) having a volume average particle diameter $D_V$ of 100 to 250 μm, containing at most 20% by weight of particles with a volume based particle diameter of at least 300 μm, and having a coefficient $C_V$ of variation of volume based particle diameter distribution of 0.1 to 30% as measured by the laser diffraction scattering method.

20 Claims, No Drawings

BINDER FOR GLASS CHOPPED STRAND MATS

TECHNICAL FIELD

The invention relates to a glass chopped strand mat binder. More specifically, the invention relates to a glass chopped strand mat binder that can maintain certain mat strength (mechanical strength such as tensile strength, the same shall apply hereinafter) even when used in an amount smaller than the conventional amount, so that a flexible mat can be prepared.

BACKGROUND ART

A glass chopped strand mat is generally obtained by the method described below.

(1) Several ten to several hundred glass single fibers (with a fiber diameter of around 10 μm) are bundled with a sizing agent to form a glass strand.

(2) The glass strand is chopped into a predetermined length, so that bundled glass chopped strands are obtained.

(3) The glass chopped strands are scattered in random directions on a transport net to form a laminate.

(4) A binder powder is scattered on the laminate and heated in an oven chamber, so that the glass chopped strands are bonded together with the binder to form a glass chopped strand mat.

In conventional techniques, an unsaturated polyester resin is often powdered by mechanical pulverization and used for the binder (see for example Patent Document 1).

Patent Document 1: Japanese Patent Application Laid-Open (JP-A) No. 2003-48255

However, conventional binders have a wide particle diameter distribution, and therefore, not all of the particles are suitable for the adhesion to a laminate of glass chopped strands. Specifically, particles with a significantly small diameter scattered on the laminate adhere only to the surface layer of the laminate and can hardly reach the inside and the back side layer of the laminate. As a result, the entire binding between glass fibers may be insufficient, so that a hard mat of low quality can be obtained. On the other hand, particles with a significantly large diameter may often fall through the interstices between the laminated strands without adhering to the laminated strands. As a result, a problem may occur in which the binder must be supplied in an amount larger than the amount originally required for the performance of the mat, such as strength.

DISCLOSURE OF INVENTION

Problems to be Solved by the Invention

An object of the invention is to provide a binder that can be supplied in an amount smaller than the conventional binder amount and can form a glass chopped strand mat being flexible and having desired uniform strength.

Solution To The Problems

The present inventors have made an intensive study in order to achieve the above object and as a result have made the invention. That is, the invention is a glass chopped strand mat binder that includes a polyester resin powder (A) having a volume average particle diameter $D_V$ of 100 to 250 μm, containing at most 20% by weight of particles with a volume based particle diameter of at least 300 μm, and having a coefficient $C_V$ of variation of volume based particle diameter distribution of 0.1 to 30% as measured by the laser diffraction scattering method.

ADVANTAGES OF THE INVENTION

The glass chopped strand mat binder of the invention has the advantageous effects described below.

(1) It can impart uniform strength to a glass chopped strand mat.

(2) It can be used in an amount smaller than the conventional amount to impart uniform strength to a glass chopped strand mat.

(3) It can form a glass chopped strand mat with high flexibility.

BEST MODE FOR CARRYING OUT THE INVENTION

Polyester Resin Powder (A)

In the invention, the polyester resin powder (A) has a volume average particle diameter $D_V$ of 100 to 250 μm, preferably 110 to 230 μm, more preferably 120 to 220 μm. If the $D_V$ is less than 100 μm, the binder may exhibit a low level of uniform adhesion to a laminate of glass chopped strands, so that the resulting glass chopped strand mats may vary in strength and have inferior quality. If the $D_V$ is more than 250 μm, a relatively large amount of the binder may fall through interstices between laminated strands without adhering to the laminated strands due to its relatively heavy weight, and the number of the binder particles per unit weight of the laminated strands may be small so that the number of bonding points between the laminated strands and the binder may be small, which may increase the amount of the binder required to form the mat.

The powder (A) contains at most 20% by weight, preferably at most 15% by weight, more preferably at most 10% by weight of particles having a volume based particle diameter of at least 300 μm. If this content is more than 20% by weight, a relatively large amount of the binder may fall through interstices between laminated strands without adhering to the laminated strands due to its relatively heavy weight, and the number of the binder particles per unit weight of the laminated strands may be small so that the number of bonding points between the laminated strands and the binder may be small, which may lead to a reduction in the strength of the resulting glass chopped strand mat.

In view of uniform adhesion of the binder to the laminate of the glass chopped strands, dust reduction, and the flexibility of the resulting mat, the content of particles with a volume based particle diameter of at most 75 μm in the powder (A) is preferably at most 20% by weight, more preferably at most 10% by weight.

In view of the uniformity of the strength of the glass chopped strand mat and a reduction in the amount of the binder for the preparation of the mat, the powder (A) preferably has a number average particle diameter (sometimes refers to as a number mean particle diameter) $D_N$ of 65 to 250 μm, more preferably 90 to 220 μm.

In view of a reduction in the amount of the binder for the preparation of the glass chopped strand mat and the uniformity of the strength of the mat, the powder (A) preferably has a ratio $[D_V/D_N]$ of the volume average particle diameter $D_V$ to the number average particle diameter $D_N$ of 1 to 1.5, more preferably 1 to 1.3.

The powder (A) has a coefficient $C_V$ of variation of volume based particle diameter distribution of 0.1 to 30%, preferably 1 to 28%, more preferably 10 to 25%. If the $C_V$ is less than 0.1%, the binder productivity may be low. If the $C_V$ is more than 30%, the efficiency of adhesion of the binder to laminated strands may be low, so that the resulting mat may have low strength uniformity. In the invention, the coefficient $C_V$ of variation may be determined as described below, and the lower coefficient $C_V$ of variation means that the volume based particle diameter distribution is narrower.

In the invention, all of the volume average particle diameter $D_V$, the number average particle diameter $D_N$, the volume based particle diameter, and the coefficient $C_V$ of variation of volume based particle diameter distribution may be determined by the laser diffraction scattering method. As a measuring instrument, for example, a particle size distribution meter [Microtrack 9320HRA Particle Size Analyzer (trade name) manufactured by NIKKISO CO., LTD. ] is exemplified.

In the invention, the particles constituting the polyester resin powder (A) may have any of a spherical shape, an ellipsoidal shape, and an indefinite shape. In view of the handleability (powder fluidity) of the binder, the shape of the particles is preferably, but not limited to, a spherical shape or a shape close thereto. In view of the fluidity of the powder (A), spherical particles preferably have a number average circularity of 0.8 to 1.0, more preferably 0.85 to 1.0, particularly preferably 0.90 to 1.0.

As used herein, the term "circularity" refers to the value calculated by the formula below, which may be measured and calculated by a process including taking a microphotograph of the particles and subjecting the photograph to image processing (such as image analysis using Microscope VK-8500 manufactured by KEYENCE CORPORATION and Shape Analysis Software VK-H1A7 installed therein and manufactured by the same company or analysis using a particle size/shape distribution analyzer "PITA-1" manufactured by SEISHIN ENTERPRISE CO., LTD.). The number average circularity refers to the value obtained by the method described below.

Circularity=$4\pi F/L^2$, wherein F represents the projected area of a particle, and L represents the projected circumference of the particle.

In the invention, each of all fine particles does not need to be in the above range, and only the number average of circularities should fall within the above range.

For example, circularity is described in Japan Concrete Institute, Research Report of Technical Committee on "non-contact full-field measurement of strain in the course of degradation/curing of concrete," Chapter 3, Experiments and research using optical full-field measurement in the field of construction, 3.6 Aggregate shape evaluation using digital technique.

In the invention, examples of a polyester resin for the polyester resin powder (A) include a condensation product of a polycarboxylic acid (a1) and a low-molecular-weight polyol (a2), a self-condensation product of a compound (a3) having carboxyl and hydroxyl groups in the same molecule, and a ring-opening condensation product of a lactone (a4).

Specific examples of the polycarboxylic acid (a1) include aliphatic polycarboxylic acids [having two to six functional groups and 3 to 30 carbon atoms(hereinafter abbreviated as C), such as succinic acid, glutaric acid, maleic acid, fumaric acid, adipic acid, azelaic acid, sebacic acid, and hexahydrophthalic acid]; aromatic polycarboxylic acids [having two to six functional groups and 8 to 30 C atoms, such as phthalic acid, isophthalic acid, terephthalic acid, tetrabromophthalic acid, tetrachlorophthalic acid, trimellitic acid, and pyromellitic acid]; alicyclic ring-containing polycarboxylic acids [having two to six functional groups and 6 to 50 C atoms, such as 1,3-cyclobutanedicarboxylic acid, 1,3-cyclopentanedicarboxylic acid, 1,2- and 1,4-cyclohexanedicarboxylic acid, 1,3- and 1,4-dicarboxymethylcyclohexane, dicyclohexyl-4,4'-dicarboxylic acid, and dimer acid]; ester forming derivatives of these polycarboxylic acids [such as acid anhydrides (e.g., maleic anhydride and phthalic anhydride), lower alkyl (C1-4) esters (e.g., dimethyl esters and diethyl esters such as dimethyl terephthalate), and acid halides (e.g., acid chlorides)]; and a mixture of at least two thereof. In particular, aliphatic polycarboxylic acids are preferred in terms of preventing discoloration of the polyester resin.

A polyol having a number average molecular weight (hereinafter abbreviated as Mn) of less than 300 (preferably an Mn of 31 to 250) per hydroxyl group [as measured by gel permeation chromatography (GPC) method] and a valence of 2 to 10 or more (preferably 2 to 3) may be used as the low-molecular-weight polyol (a2).

Examples of the polyol (a2) include a dihydric alcohol (a21), a polyhydric alcohol (a22) with a valence of 3 to 10 or more, low-molar alkylene oxide [hereinafter abbreviated as AO (having 2 to 10 C atoms) ] adducts (a23) (1 to 10 AO) of these alcohols or polyhydric phenols (with a valence of 2 to 3 or more); and a mixture of at least two thereof.

Examples of AO include ethylene oxide (hereinafter abbreviated as EO), propylene oxide (hereinafter abbreviated as PO), 1,2-, 1,3-, and 2,3-butylene oxide, tetrahydrofuran (hereinafter abbreviated as THF), styrene oxide, a-olefin oxide of 5 to 10 C atoms or more, epichlorohydrin; and a combination of at least two thereof (for block and/or random addition). Among these AOs, EO, PO, and a combination thereof are preferred in view of the strength of the mat and the permeability of styrene monomers or the like to the mat in the application of the mat to glass fiber-reinforced plastics.

Specific examples of the dihydric alcohol (a21) include aliphatic alcohols [straight-chain alcohols [e.g., ethylene glycol, diethylene glycol, 1,3-propylene glycol, 1,4-butanediol, 1,5-pentanediol, 1,6-hexanediol (hereinafter abbreviated as EG, DEG, 1,3-PG, 1,4-BD, 1,5-PD, 1,6-HD, respectively]; branched-chain alcohols [e.g., 1,2-propylene glycol, neopentylglycol (hereinafter abbreviated as 1,2-PG and NPG, resepectively), 3-methyl-1,5-pentanediol, 2,2-diethyl-1,3-propanediol, and 1,2-, 1,3- and 2,3-butanediol]; and ring-containing alcohols [such as alicyclic ring-containing alcohols (e.g., 1,4-bis(hydroxymethyl)cyclohexane) and aromatic aliphatic alcohols (e.g., m- and p-xylylene glycol)].

Specific examples of the polyhydric alcohol (a22) with a valence of 3 to 10 or more include alkane polyols [of 3 to 10 C atoms, such as glycerin, trimethylolpropane, pentaerythritol, and sorbitol (hereinafter abbreviated as GR, TMP, PE, and SO, respectively)]; and intermolecular or intramolecular dehydration products of the alkane polyols [such as di-PE and poly-GR (with a degree of polymerization of 2 to 8) and sorbitan]; and saccharides and derivatives thereof (glycosides) (such as sucrose and methylglucoside). Among the above (a21) and (a22) alcohols, aliphatic alcohols are preferred in view of mat strength, and 1,4-BD and NPG are more preferred.

Specific examples of the adducts (a23) include low-molar AO adducts of the (a21) or (a22) alcohols and low-molar AO adducts of ring-containing polyhydric phenols (with a valence of 2 to 3 or more).

Examples of the polyhydric phenols include dihydric phenols of 6 to 18 C atoms such as monocyclic dihydric phenols (e.g., hydroquinone, catechol, resorcinol, and urushiol), bisphenols (e.g., bisphenols A, F, C, B, AD, and S, dihydroxybiphenyl, and 4,4'-dihydroxydiphenyl-2,2-butane), and fused polycyclic dihydric phenols [such as dihydroxynaphthalene (e.g., 1,5-dihydroxynaphthalene) and binaphthol]; and aldehyde or ketone (formaldehyde, glutaraldehyde, glyoxal, or acetone) condensates of polyhydric phenols with a valence of 3 to 8 or more, such as monocyclic polyhydric phenols (such as pyrogallol, phloroglucinol, and monohydric or dihydric phenols (such as phenol, cresol, xylenol, and resorcinol), (such as phenol or cresol novolac resins, resol intermediates, polyphenols obtained by the condensation reaction of phenol with glyoxal or glutaraldehyde, and polyphenols obtained by the condensation reaction of resorcin with acetone).

Specific examples of the compound (a3) having carboxyl and hydroxyl groups in the same molecule include C2-10 compounds such as lactic acid, glycolic acid, β-hydroxybutyric acid, hydroxypivalic acid, and hydroxyvaleric acid; and a mixture of at least two thereof.

Examples of the lactone include C4-15 lactones (preferably C6-12 lactones) such as ε-caprolactone, γ-butyrolactone and γ-valerolactone.

In view of prompt polycondensation reaction and the permeability of the styrene or the like to the mat, the polyester resin is preferably a polycondensation product of the polycarboxylic acid (a1) and the low-molecular-weight polyol (a2), more preferably a polycondensation product of the polycarboxylic acid and the AO adduct of a ring-containing, polyvalent hydroxyl group-containing compound, particularly preferably a polycondensation product of the aliphatic polycarboxylic acid and the ring-containing polyhydric phenol or the low-molar AO adduct of the aromatic aliphatic alcohol.

The polycondensation reaction temperature is generally, but not limited to, from 100 to 300° C., preferably from 130 to 220° C. The polycondensation reaction is generally performed under atmospheric pressure or reduced pressure (e.g., at most 133 Pa). In order to prevent discoloration of the polyester resin, the reaction is preferably performed under an atmosphere of inert gas such as nitrogen.

In the polycondensation reaction, the equivalent ratio between (a1) and (a2) (the equivalent ratio of carboxyl/hydroxyl) is preferably from 0.9/1 to 1.4/1, more preferably from 0.9/1 to 1.2/1 in view of prompt polycondensation reaction and the stability of the physical properties of the resulting polyester resin. After the production, the polyester resin preferably has an acid value of at most 20, more preferably 0 to 15 in view of water resistance.

The polycondensation reaction may be performed with no catalyst or with an esterification catalyst.

Examples of the esterification catalyst include proton acids (such as phosphoric acid), carboxylic acid (C2-4) salts, carbonic acid salts, sulfuric acid salts, phosphoric acid salts, oxides, chlorides, hydroxides, or alkoxides of metals (such as alkali metals, alkaline earth metals, transition metals, and 2B, 4A, 4B, and 5B group metals).

In view of reactivity, carboxylic acid (C2-4) salts, oxides or alkoxides of 2B, 4A, 4B, and 5B group metals are particularly preferred, and in view of less discoloration of the product, antimony trioxide, monobutyltin oxide, tetrabutyl titanate, tetrabutoxy titanate, tetrabutyl zirconate, zirconyl acetate, and zinc acetate are more preferred.

The esterification catalyst may be used in any amount, as long as the desired molecular weight can be obtained. In view of reactivity and less discoloration, the esterification catalyst is preferably used in an amount of 0.005 to 3%, more preferably 0.01 to 1%, based on the total weight of the polycarboxylic acid (a1) and the low-molecular-weight polyol (a2).

In order to promote the reaction, an organic solvent may be added and refluxed. After the reaction is completed, the organic solvent should be removed. The organic solvent is typically, but not limited to, a solvent not having active hydrogen as in a hydroxyl group, such as a hydrocarbon (e.g., toluene and xylene), a ketone (e.g., methyl ethyl ketone and methyl isobutyl ketone), or an ester (e.g., ethyl acetate and butyl acetate).

The self-condensation reaction of the compound (a3) having carboxyl and hydroxyl groups in the same molecule and the ring-opening polycondensation reaction of the lactone (a4) may be performed under reaction conditions similar to those in the polycondensation reaction of the polycarboxylic acid (a1) with the low-molecular-weight polyol (a2).

In the invention, the polyester resin for forming the polyester resin powder (A) preferably has a weight average molecular weight (hereinafter abbreviated as Mw) of 5,000 to 50,000, more preferably 10,000 to 45,000 and preferably has a number average molecular weight (hereinafter abbreviated as Mn) of 400 to 4,500, more preferably 800 to 4,000 (as measured by GPC method) in view of the strength and flexibility of the glass chopped strand mat.

As measured by the ring and ball method (JIS K 2207, "Petroleum Asphalt," "6.4 Softening Point Test Method"), the polyester resin preferably has a softening point of 80 to 150° C., more preferably 90 to 140° C. in terms of preventing the glass chopped strand mat from being sticky and post-processing workability of the glass chopped strand mat, and in terms of the property of binding glass chopped strands.

When subjected to differential thermal analysis, the polyester resin preferably has a glass transition temperature (hereinafter abbreviated as Tg) of 40 to 60° C., more preferably 45 to 55° C. (as measured according to JIS K 7121, "Method of Measuring Transition Temperature of Plastics") in terms of preventing blocking during the storage of the binder and in terms of post-processing workability of the glass chopped strand mat.

In the invention, the polyester resin powder (A) may be produced as described below.

First, the alcohol component, the acid component and the catalyst (such as dibutyltin oxide) are added to a reaction vessel equipped with a condenser tube, a stirring rod, a thermometer, and a nitrogen introducing tube and heated generally at 150 to 170° C. for 4 to 6 hours under a nitrogen atmosphere to allow to react. The mixture is then heated to 200° C. and further allowed to react under a reduced pressure of 3 to 4 kPa for generally 6 to 8 hours, while the acid value is checked. After the acid value (in units of mgKOH/g) becomes at most 20, the product is cooled to 180° C. so that a polyester resin can be obtained.

Methods for producing the polyester resin powder (A) from the polyester resin include the production methods (1) to (3) described below. Among these methods, the methods (1) and (2) are industrially preferred, and the production method (2) is more preferred in view of productivity.

(1) Grinding Method

The method includes grinding the polyester resin into particles using, for example, a sample mill (Model SK-M10 manufactured by Kyoritsu Riko Co., Ltd.) at a rotation speed of about 10,000 rpm for 3 to 5 minutes and then sieving the particles with a combination of screens of different meshes to obtain the polyester resin powder (A).

(2) Dispersion Method

This method includes dispersing, in a dispersing agent-containing aqueous medium, a solution of the polyester resin in an organic solvent [such as an ester (e.g., ethyl acetate and butyl acetate) or a ketone (e.g., acetone, methyl ethyl ketone and methyl isopropyl ketone)] using a dispersing machine to form a dispersion of the polyester resin; and isolating and drying the resin particles from the dispersion to obtain the polyester resin powder (A).

Examples of the dispersing agent include anionic, cationic, nonionic, and ampholytic surfactants, polymer type dispersing agents, and a combination thereof.

Examples of the anionic surfactants include those having a C8-24 hydrocarbon group as a hydrophobic group, such as ether carboxylates [e.g., sodium (poly)oxyethylene (with a degree of polymerization of 1 to 10) lauryl ether acetate], (ether)sulfates (salts) [e.g., sodium lauryl sulfate and sodium (poly)oxyethylene (with a degree of polymerization of 1 to 100) lauryl sulfate], sulfonates [e.g., sodium dodecylbenzenesulfonate], sulfosuccinates, (ether)phosphates (salts) [e.g., sodium lauryl phosphate and sodium (poly)oxyethylene (with a degree of polymerization of 1 to 100) lauryl ether phosphate], fatty acid salts [e.g., sodium laurate], and acylated amino acid salts [e.g., sodium coconut oil fatty acid methyl taurate].

Examples of the nonionic surfactants include aliphatic alcohol (C8-24) AO (C2-8) adducts (with a degree of polymerization of 1 to 100), polyhydric alcohol (with a valence of 2 to 10 or more) fatty acid (C8-24) esters (e.g., glyceryl monostearate), fatty acid (C8-24) alkanolamide (e.g., 1:1 type coconut oil fatty acid diethanolamide), (poly)oxyalkylene (C2-8) (with a degree of polymerization of 1 to 100) alkyl (C1-22) phenyl ether, (poly)oxyalkylene (C2-8) (with a degree of polymerization of 1 to 100) alkyl (C8-24) amine, and alkyl (C8-24) dialkyl (C1-6) amine oxide.

Examples of the cationic surfactants include quaternary ammonium type surfactants [e.g., stearyl trimethyl ammonium chloride] and amine salt type surfactants [e.g., lactate of stearic acid diethylaminoethylamide].

Examples of the ampholytic surfactants include betaine type surfactants [e.g., coconut oil fatty acid amide propyldimethylaminoacetic acid betaine] and amino acid type surfactants [e.g., sodium β-laurylaminopropionate].

Examples of the polymer type dispersing agents include polyvinyl alcohol, starch and derivatives thereof, cellulose derivatives (e.g., carboxymethyl cellulose, methyl cellulose, and hydroxyethyl cellulose), carboxyl group-containing (co) polymers (e.g., sodium polyacrylate), and polymer type dispersing agents having a urethane or ester bond as disclosed in JP-A Nos. 07-133423 and 08-120041 [e.g., a compound formed by linking polycaprolactone polyol and polyether diol through a polyisocyanate].

These polymer type dispersing agents generally have an Mw of 3,000 to 1,000,000, preferably 5,000 to 100,000.

Among these dispersing agents, nonionic surfactants and polymer type dispersing agents are preferred in terms of preventing secondary aggregation after the dispersion, and the polymer type dispersing agents having a urethane or ester bond disclosed in the publications are more preferred.

In view of the dispersibility and granulating ability of the polyester resin, the dispersing agent is preferably used in an amount of 0.1 to 5%, more preferably 0.2 to 8%, based on the weight of the polyester resin. Based on the weight of water, the dispersing agent is preferably used in an amount of 0.01 to 7%, more preferably 0.1 to 5% in terms of easily obtaining resin particles with the desired volume average particle diameter.

In view of the dispersibility and volume average particle diameter of the polyester resin, an aqueous medium comprising the dispersing agent and water is preferably used in an amount of 50 to 1,000%, more preferably 100 to 1,000%, based on the weight of the polyester resin.

When the organic solvent solution of the polyester resin is dispersed in the dispersing agent-containing aqueous medium, if necessary, the organic solvent solution may be heated to 40 to 100° C. so that its viscosity can be lowered.

Examples of the dispersing machine in the method (2) include high speed shearing type, friction type, high pressure jet type, and ultrasonic type dispersing machines. Above all, a high speed shearing type dispersing machine is preferred in terms of easily obtaining resin particles with the desired volume average particle diameter. When a high speed shearing type dispersing machine (e.g., Ultra Disperser (trade name) manufactured by YAMATO SCIENTIFIC CO., LTD.) is used, the rotation speed is preferably from 1,000 to 30,000 rpm, more preferably from 2,000 to 10,000 rpm, and the dispersing time is preferably from 0.1 to 5 minutes, from the same viewpoint as described above.

In the method (2), the dispersion is subjected to filtration or separation by a known method using a filter press, a Sparkler filter, a centrifuge, or the like, and the resulting resin particles are dried to give the polyester resin powder (A). The resin particles may be dried by a known method using an air circulation dryer, a spray dryer, a fluidized bed dryer, or the like.

(3) Precipitation Method

This method includes optionally adding a dispersing agent to the organic solvent solution obtained in the method (2), gradually adding a poor solvent (such as cyclohexane or petroleum ether) to the solution, then precipitating the resin particles by mixing with the dispersing machine or based on different solubilities of the resin in the organic solvent solution at different temperatures (for example, by gradually cooling the organic solvent solution from high temperature), and separating and drying the resin particles to obtain the polyester resin powder (A).

In this method, if the precipitated particles are coarse, a dispersing agent may be used, which may be the same as in the method (2). In terms of preventing secondary aggregation after the dispersion of the resin particles, nonionic surfactants and polymer type dispersing agents are preferred, and the polymer type dispersing agents having a urethane or ester bond described in the publications are more preferred. The dispersing machine used in the method (3) may be the same as in the method (2).

In view of the dispersibility and granulating ability of the polyester resin, the dispersing agent is preferably used in an amount of 0.1 to 5%, more preferably 0.2 to 8%, based on the weight of the polyester resin. Based on the weight of the solvent, the dispersing agent is preferably used in an amount of 0.01 to 7%, more preferably 0.1 to 5% in terms of easily obtaining resin particles with the desired volume average particle diameter.

In view of the dispersibility and volume average particle diameter of the polyester resin, a dispersing medium comprising the dispersing agent and the solvent is preferably used in an amount of 50 to 1,000%, more preferably 100 to 1,000%, based on the weight of the polyester resin.

When the method (3) is based on different solubilities at different temperatures, the cooling speed is preferably at most 2° C./minute in terms of preventing secondary aggregation.

Additives (B)

If necessary, the glass chopped strand mat binder of the invention comprising the polyester resin powder (A) may further comprise at least one additive (B) selected from the group consisting of an anti-blocking agent (B1), a lubricant (B2) and a hydrophilizing agent (B3), which are other than the powder (A). These additives (B) may be added generally after the polyester resin is ground and sieved.

The additives (B) is generally used in a total amount of at most 8%, preferably 0.01 to 5%, more preferably 0.1 to 3%, based on the weight of the polyester resin.

Examples of the anti-blocking agent (B1) include fine particles of a higher fatty acid or a salt thereof, an oxide of silicon or metal, a carbide of silicon or metal, calcium carbonate, talc, an organic resin, and any mixture thereof.

Examples of the higher fatty acid include C8-C24 fatty acids such as lauric acid and stearic acid. Examples of the salt of the higher fatty acid include alkali metal (e.g., Na, K or Li), alkaline earth metal (e.g., Ca, Ba or Mg), Zn, Cu, Ni, Co, and Al salts of the higher fatty acid.

Examples of the oxide of silicon or metal include silicon dioxide, silicon oxide, aluminum oxide, iron oxide, titanium oxide, magnesium oxide, and zirconium oxide, and the like. Examples of the carbide include silicon carbide and aluminum carbide.

Examples of the organic resin include a polyolefin resin, a polyamide resin, a poly(meth)acrylic resin, a silicone resin, a polyurethane resin, a phenolic resin, a polytetrafluoroethylene resin, cellulose powder, and the like.

Among these materials, the higher fatty acid metal salt and the oxide of silicon or metal are preferred in view of powder fluidity.

Based on the weight of the polyester resin, the agent (B1) is generally used in an amount of at most 5%, and preferably used in an amount of 0.01 to 2.0%, more preferably 0.1 to 1.0% in view of the prevention of the blocking of the binder and the property of binding glass fibers.

Examples of the lubricant (B2) include a wax, a low-molecular-weight polyethylene, a higher alcohol, a higher fatty acid (metal salt), a higher fatty acid ester, a higher fatty acid amide, and the like.

The wax may be a carnauba wax or the like. The low-molecular-weight polyethylene may be a polyethylene with an Mn of 1,000 to 10,000. The higher alcohol may be a C10-24 alcohol such as stearic acid. The higher fatty acid ester may be a C10-36 fatty acid ester such as butyl stearate or a higher fatty acid (C10-24) ester of AO (C2-3) adduct of polyhydric alcohol (with a valence of 2 to 4) (e.g., a monostearate of 5-mole EO adduct of EG). The higher fatty acid amide may be a C10-40 fatty acid amide such as stearic acid amide.

Among these materials, a higher fatty acid (C10-24) ester of AO (C2-3) adduct of polyhydric alcohol (with a valence of 2 to 4) and a higher fatty acid amide are preferred in view of the property of binding glass fibers.

Based on the weight of the polyester resin, the lubricant (B2) is generally used in an amount of at most 5%, and preferably used in an amount of 0.01 to 2.0%, more preferably 0.1 to 1.0% in view of the powder fluidity and the property of binding glass fibers.

Examples of the hydrophilizing agent (B3) include polyvinyl alcohol (1,000 to 10,000 in Mn), carboxymethyl cellulose, sodium alginate, polyethylene glycol (hereinafter abbreviated as PEG) (200 to 20,000 in Mn), PEG (100 to 2,000 in Mn)-containing organopolysiloxane (200 to 50,000 in Mn), starch, sodium polyacrylate (500 to 20,000 in Mn), and quaternary ammonium salt group-containing, (meth)acryloyl group-containing polymers.

Among these materials, PEG and PEG chain-containing organopolysiloxane are preferred in view of the property of binding glass fibers.

Based on the weight of the polyester resin, the agent (B3) is generally used in an amount of at most 5%, and preferably used in an amount of 0.01 to 2.0%, more preferably 0.1 to 1.0% in view of the affinity for water sprayed on a laminate of glass chopped strands as described below and in view of the property of binding glass fibers.

Glass Chopped Strand Mat

The glass chopped strand mat of the invention comprises: a laminate of glass chopped strands; and the glass chopped strand mat binder comprising the polyester resin powder (A) and may be manufactured by the procedure described below.

In view of the mechanical strength and uniformity of the mat and a reduction in the amount of the binder to be used, the ratio $[D_V/K]$ of the volume average particle diameter $D_V$ (μm) of the polyester resin powder (A) to the glass strand diameter K (μm) calculated from the formula (1) below is preferably from 0.1 to 4, more preferably from 0.3 to 3.

$$K=20\times[10T/(d\pi)]^{1/2} \qquad (1),$$

wherein T represents the average strand count (tex) of the glass strand, d represents the glass fiber density (g/cm³), and π represents the circular constant.

The average strand count of the glass strands for forming the glass chopped strand mat is preferably from 10 to 150 tex, more preferably 15 to 120 tex, in view of the glass strand industry and in view of the size and cross-sectional shape uniformity of the glass strands.

For example, the glass chopped strand mat of the invention may be manufactured by the process described below.

(1) In a release-treated flat sheet die, glass chopped strands are scattered in random directions so as to provide a uniform thickness, so that a laminate of the glass chopped strands is obtained.

(2) From an atomizer, tap water is sprayed in substantially the same amount as that of the scattered glass chopped strands so that the surface of the glass chopped strands can become sufficiently wet.

(3) A predetermined amount of the glass chopped strand mat binder is uniformly deposited.

(4) The steps (1) to (3) are performed once to three times or more, so that a laminate is obtained.

(5) The laminate is pressed in a pressing machine heated to 150 to 170° C., so that a glass chopped strand mat comprising the strands bonded with the binder is obtained.

Based on the weight of the laminate of the glass chopped strands, the binder is preferably bonded in an amount of 1 to 30%, more preferably 3 to 25%, in view of the mechanical strength and handleability of the mat (e.g., flexibility and the ability to fit into a molding die in the process of preparing a glass fiber reinforced plastic molded product as described below, the same shall apply hereinafter).

The glass chopped strand mat obtained in the step (5) preferably has a mat weight (g/m²) of 50 to 600, more preferably 100 to 500, in view of the mechanical strength and handleability of the mat.

The ignition loss ratio of the glass chopped strand mat calculated from the formula shown below is preferably at least 90%, more preferably at least 93%, in view of a reduction in the falling amount of the binder and the desired mechanical strength of the mat.

The difference between the maximum and minimum tensile strengths of the glass chopped strand mat is preferably less than 40 N, more preferably at most 35 N, particularly preferably at most 30 N, in view of the handleability of the mat.

The tensile strength may be measured according to JIS R 3420 as described below, and the difference between the maximum and minimum tensile strengths may be evaluated as a difference between the maximum and minimum values obtained with respect to ten test pieces.

The glass fiber reinforced plastic molded product of the invention may be obtained by any molding method such as a hand lay up method, a spray up method, a preform method, a matched die method, or an SMC method. For example, the hand lay up method is generally performed according to the following procedure.

(1) A release agent is applied to the surface of a molding die.

(2) A coating of a matrix resin (e.g., an unsaturated polyester resin) with a uniform thickness is performed at room temperature (15 to 25° C.) using a roller or the like.

(3) The resin is allowed to gel in a warm air furnace whose temperature is adjusted to about 40° C.

(4) The glass chopped strand mat is fitted on the surface of the molding die, and a solution prepared by diluting the matrix resin with a styrene monomer or the like is laminated on the glass chopped strand mat using a roller or the like. The air is removed using a roller or the like.

(5) The laminate is cured in the warm air furnace.

(6) The molded product is taken out of the die and obtained.

Examples of the matrix resin for use in the molding methods including the hand lay up method include thermosetting resins (e.g., unsaturated polyester resins, vinyl ester resins, epoxy resins, phenolic resins, polyurethane resins, silicone resins, modified acrylic resins, and furan resins) and thermoplastic resins (e.g., ABS resins, polycarbonate resins, polyethylene terephthalate resins, polyamide resins, polyether imide resins, and polyimide resins).

Among these resins, thermosetting resins are typically used in the case of the hand lay up method, and unsaturated polyester resins and vinyl ester resins are preferred in view of workability during molding.

EXAMPLES

The invention is more specifically described by the examples below, which are not intended to limit the scope of the invention. Hereinafter, the term "parts" means parts by weight.

Production Example 1

Production of Binder (X-1)

(1) Production of Polyester Resin

To a reaction vessel equipped with a condenser tube, a stirring rod, a thermometer, and a nitrogen introducing tube were added 3,365 parts of a 2.2 mole EO adduct of bisphenol A, 1,123 parts of fumaric acid, and 6 parts of dibutyltin oxide, and allowed to react in a nitrogen atmosphere at 180° C. for 4 hours. The mixture was then heated to 200° C. and allowed to react under a reduced pressure of 3 to 4 kPa for 5.5 hours. The reaction mixture was further heated to 210° C., and when having an acid value of 16.0, the reaction product was cooled to 180° C. and then taken out to give polyester resin 1.

(2) Production of Polyester Resin Powder (A-1) Using a sample mill [SK-M10 (equipment name) manufactured by Kyoritsu Riko Co., Ltd., the same shall apply hereinafter], 100 parts of polyester resin 1 was ground at a rotation speed of 10,000 rpm for 5 minutes. The resulting resin powder was sieved with a 180 μm-mesh screen, and the resin powder passing therethrough was further sieved with a 150 μm-mesh screen, so that polyester resin powder (A-1) was obtained, which was left on the 150 μm screen.

Powder (A-1) had an Mw of 30,000, an Mn of 2,800, a softening point of 116° C., and a Tg of 53° C. Its volume average particle diameter ($D_V$), the content of particles with a volume based particle diameter of at least 300 μm in all particles, the coefficient ($C_V$) of variation, the content of particles with a volume based particle diameter of at most 75 μm in all particles, and the ratio ($D_V$)/($D_N$) are each shown in Table 1.

(3) Production of Binder (X-1)

After 0.03 parts of an anti-blocking agent [AEROSIL 200 (trade name) manufactured by Nippon Aerosil Co., Ltd., the same shall apply hereinafter] was added to 10 parts of (A-1), the materials were mixed to give a binder (X-1).

Production Example 2

Production of Binder (X-2)

(1) Production of Polyester Resin Powder (A-2) Using the sample mill, 100 parts of polyester resin 1 was ground at a rotation speed of 12,500 rpm for 3 minutes. The resulting resin powder was sieved with a 250 μm-mesh screen, and the resin powder passing therethrough was further sieved with a 212 μm-mesh screen, so that polyester resin powder (A-2) was obtained, which was left on the 212 μm screen.

The Mw, Mn, softening point, and Tg of (A-2) were the same as those of (A-1), and the values of the other evaluation items are shown in Table 1.

(2) Production of Binder (X-2)

After 0.03 parts of the anti-blocking agent was added to 10 parts of (A-2), the materials were mixed to give a binder (X-2).

Production Example 3

Production of Binder (X-3)

(1) Production of Polyester Resin Powder (A-3)

Using the sample mill, 100 parts of polyester resin 1 was ground at a rotation speed of 12,500 rpm for 3 minutes. The resulting resin powder was then sieved with a 106 μm-mesh screen, so that polyester resin powder (A-3) was obtained, which passed through the screen.

The Mw, Mn, softening point, and Tg of (A-3) were the same as those of (A-1), and the values of the other evaluation items are shown in Table 1.

(2) Production of Binder (X-3) After 0.03 parts of the anti-blocking agent was added to 10 parts of (A-3), the materials were mixed to give a binder (X-3).

Production Example 4

Production of Binder (X-4)

(1) Production of Polyester Resin Powder (A-4)

Using the sample mill, 100 parts of polyester resin 1 was ground at a rotation speed of 15,000 rpm for 5 minutes. The resulting resin powder was then sieved with a 160 μm-mesh screen, and the resin powder passing therethrough was further sieved with a 150 μm-mesh screen, so that polyester resin powder (A-4) was obtained, which was left on the 150 μm screen.

The Mw, Mn, softening point, and Tg of (A-4) were the same as those of (A-1), and the values of the other evaluation items are shown in Table 1.

(2) Production of Binder (X-4)

After 0.03 parts of the anti-blocking agent was added to 10 parts of (A-4), the materials were mixed to give a binder (X-4).

Production Example 5

Production of Binder (X-5)

(1) Production of Polyester Resin Powder (A-5)

One hundred parts of polyester resin 1 was dissolved in 200 parts of ethyl acetate and mixed. After a dilution of 4 parts of a 14 mole EO adduct of nonylphenol [Nonipol 200 (trade name) manufactured by Sanyo Chemical Industries, Ltd., the same shall apply hereinafter] to 500 parts of water was added to the mixture, the materials were mixed using a high-speed shearing type dispersing machine [Ultra Disperser (trade name) manufactured by YAMATO SCIENTIFIC CO., LTD.] at a rotation speed of 9,000 rpm for 5 minutes. The liquid mixture was then added to a reaction vessel and heated to 50° C., and a resin particle dispersion comprising polyester resin 1 was obtained by removing ethyl acetate by distillation under a reduced pressure of 20 to 30 kPa. The resin particle dispersion was then subjected to centrifugation, and a process including removing the supernatant, then adding water and subjecting the mixture to centrifugation was repeated twice. The precipitate layer was dried under the conditions of 50° C. and a reduced pressure of 1.3 kPa. The resulting resin powder was sieved with a 250 μm-mesh screen, and the resin powder passing therethrough was further sieved with a 212 μm-mesh screen, so that polyester resin powder (A-5) was obtained, which was left on the 212 μm screen.

The Mw, Mn, softening point, and Tg of (A-5) were the same as those of (A-1), and the number average circularity of (A-5) was 0.93. The values of the other evaluation items are shown in Table 1.

(2) Production of Binder (X-5)

After 0.03 parts of the anti-blocking agent was added to 10 parts of (A-5), the materials were mixed to give a binder (X-5).

Production Example 6

Production of Binder (X-6)

(1) Production of Polyester Resin

Polyester resin 2 was obtained in the same manner as in the process (1) of Production Example 1, except that the reaction under a reduced pressure of 3 to 4 kPa was performed for 1 hour instead of 5.5 hours, and then the mixture was further heated to 210° C., and when having an acid value of 19.0, the reaction product was cooled to 180° C. and taken out.

(2) Production of Polyester Resin Powder (A-6)

Polyester resin powder (A-6) was obtained in the same manner as in the process (2) of Production Example 1, except that 100 parts of polyester resin 2 was used in place of 100 parts of polyester resin 1.

Powder (A-6) had an Mw of 6,500, an Mn of 2,300, a softening point of 88° C., and a Tg of 48° C., and the values of the other evaluation items are shown in Table 1.

(3) Production of Binder (X-6)

After 0.03 parts of the anti-blocking agent was added to 10 parts of (A-6), the materials were mixed to give a binder (X-6).

Production Example 7

Production of Binder (X-7)

(1) Production of Polyester Resin

Polyester resin 3 was obtained in the same manner as in the process (1) of Production Example 1, except that the reaction under a reduced pressure of 3 to 4 kPa was performed for 8 hours instead of 5.5 hours, and then the mixture was further heated to 210° C., and when having an acid value of 5.5, the reaction product was cooled to 180° C. and taken out.

(2) Production of Polyester Resin Powder (A-7)

Polyester resin powder (A-7) was obtained in the same manner as in the process (2) of Production Example 1, except that 100 parts of polyester resin 3 was used in place of 100 parts of polyester resin 1.

Powder (A-7) had an Mw of 40,000, an Mn of 4,300, a softening point of 130° C., and a Tg of 56° C., and the values of the other evaluation items are shown in Table 1.

(3) Production of Binder (X-7)

After 0.03 parts of the anti-blocking agent was added to 10 parts of (A-7), the materials were mixed to give a binder (X-7).

Comparative Production Example 1

Production of Binder (X'-1)

(1) Production of Polyester Resin Powder (A'-1)

Using the sample mill, 100 parts of polyester resin 1 was ground at a rotation speed of 12,500 rpm for 3 minutes. The resulting resin powder was then sieved with a 180 μm-mesh screen, so that polyester resin powder (A'-1) was obtained, which passed through the screen.

The Mw, Mn, softening point, and Tg of (A'-1) were the same as those of (A-1), and the values of the other evaluation items are shown in Table 1.

(2) Production of Binder (X'-1)

After 0.03 parts of the anti-blocking agent was added to 10 parts of (A'-1), the materials were mixed to give a binder (X'-1).

Comparative Production Example 2

Production of Binder (X'-2)

(1) Production of Polyester Resin Powder (A'-2)

Using the sample mill, 100 parts of polyester resin 1 was ground at a rotation speed of 12,500 rpm for 3 minutes. The resulting resin powder was then sieved with a 150 μm-mesh screen, so that polyester resin powder (A'-2) was obtained, which was left on the screen.

The Mw, Mn, softening point, and Tg of (A'-2) were the same as those of (A-1), and the values of the other evaluation items are shown in Table 1.

(2) Production of Binder (X'-2)

After 0.03 parts of the anti-blocking agent was added to 10 parts of (A'-2), the materials were mixed to give a binder (X'-2).

Comparative Production Example 3

Production of Binder (X'-3)

(1) Production of Polyester Resin Powder (A'-3)

Using the sample mill, 100 parts of polyester resin 1 was ground at a rotation speed of 7,500 rpm for 3 minutes. The resulting resin powder was then sieved with a 250 μm-mesh screen, so that polyester resin powder (A'-3) was obtained, which passed through the screen.

The Mw, Mn, softening point, and Tg of (A'-3) were the same as those of (A-1), and the values of the other evaluation items are shown in Table 1.

(2) Production of Binder (X'-3)

After 0.03 parts of the anti-blocking agent was added to 10 parts of (A'-3), the materials were mixed to give a binder (X'-3).

Comparative Production Example 4

Production of Binder (X'-4)

(1) Production of Polyester Resin Powder (A'-4)

Using the sample mill, 100 parts of polyester resin 1 was ground at a rotation speed of 12,500 rpm for 3 minutes. The resulting resin powder was then sieved with a 300 μm-mesh screen, and the resin powder passing therethrough was further sieved with a 250 μm-mesh screen, so that polyester resin powder (A'-4) was obtained, which was left on the 250 pm screen.

The Mw, Mn, softening point, and Tg of (A'-4) were the same as those of (A-1), and the values of the other evaluation items are shown in Table 1.

(2) Production of Binder (X'-4)

After 0.03 parts of the anti-blocking agent was added to 10 parts of (A'-4), the materials were mixed to give a binder (X'-4).

Comparative Production Example 5

Production of Binder (X'-5)

(1) Production of Polyester Resin Powder (A'-5)

Using the sample mill, 100 parts of polyester resin 1 was ground at a rotation speed of 12,500 rpm for 3 minutes. The resulting resin powder was then sieved with a 106 μm-mesh screen, and the resin powder passing therethrough was further sieved with a 75 μm-mesh screen, so that polyester resin powder (A'-5) was obtained, which was left on the 75 μm screen.

The Mw, Mn, softening point, and Tg of (A'-5) were the same as those of (A-1), and the values of the other evaluation items are shown in Table 1.

(2) Production of Binder (X'-5)

After 0.03 parts of the anti-blocking agent was added to 10 parts of (A'-5), the materials were mixed to give a binder (X'-5).

Example 1

Preparation of Glass Chopped Strand Mat (GM-1)

A glass strand (for glass chopped strands) (with an average strand count T of 30 tex, a glass fiber density d of 2.5 g/cm$^3$, and a glass strand diameter K of 123.6 μm) was chopped into a length of about 5 cm using a glass chopper manufactured by Higashi Giken Co., Ltd., so that glass chopped strands were obtained. As used herein, T, d and K have the same meanings as described above.

In a release-treated flat sheet die of 75 cm×40 cm×3 cm, 45.0 g of the glass chopped strands were scattered in random directions so as to provide a uniform thickness. Tap water was then sprayed from an atomizer to such an extent that the surface of the scattered glass chopped strands became wet.

Subsequently, 1.35 g of binder (X-1), corresponding to 3.0% of the weight of the scattered glass chopped strands, was uniformly scattered on the scattered glass chopped strands.

A process including scattering 45.0 g of the glass chopped strands, spraying tap water, and scattering 1.35 g of binder (X-1) was further performed twice thereon in the same manner. As a result, in total, 135.0 g of the glass chopped strands and 4.05 g of binder (X-1), corresponding to 3.0% thereof, were scattered to form a laminate of the glass chopped strands, which had a three-layer structure.

The laminate was then hot pressed at a speed of 1.5 m/minute in a roll press machine heated at 150° C., so that a glass chopped strand mat (GM-1) was obtained, which had a thickness of 1.2 mm, a mat weight of 450 g/m$^2$ (the amount of the glass chopped strands used per square meter of the mat, the same shall apply hereinafter), and an ignition loss of 2.70% (an ignition loss ratio of 93%).

The ignition loss (% by weight) is the value obtained by the measurement according to JIS R 3420 as described below. The specific procedure is as follows.

(1) About 5 g of a test piece is placed in a porcelain crucible and dried at 105° C. for 30 minutes. Thereafter, the test piece-containing crucible is allowed to cool to room temperature in a desiccator, and its weight (m1) is measured down to 0.1 mg. The porcelain crucible containing the dried test piece is placed in an electric furnace whose temperature is controlled to 625° C. The test piece is ignited for 5 minutes, while the door is opened. Thereafter, the door is closed, and the test piece is further ignited for 10 minutes. The test piece-containing porcelain crucible is then taken out and allowed to cool to room temperature in a desiccator, and its weight (m2) is measured down to 0.1 mg.

(2) The empty porcelain crucible containing no test piece is dried at 105° C. for 30 minutes and then allowed to cool to room temperature in a desiccator, and its weight (m0) is measured down to 0.1 mg.

(3) The ignition loss is calculated from the following formula: Ignition loss (% by weight)=100×[(m1)-(m2)]/[(m1)-(m0)]

A binder for use in a glass chopped strand mat for FRP is often supplied in an amount of about 3% by weight, based on the weight of the glass chopped strands. Therefore, the present binder was supplied in an amount corresponding to 3.0% of the weight of the glass chopped strands (that is, 2.91% of the weight of the resulting glass chopped strand mat), and the ignition loss ratio was calculated from the formula shown below.

The ignition loss ratio is preferably at least 90%, more preferably at least 93%, in view of a reduction in the falling amount of the binder and in view of the necessary strength of the glass chopped strand mat. If the mat strength is insufficient, the amount of the supply of the binder must be increased, which may increase the manufacturing cost of the mat.

Example 2

Preparation of Glass Chopped Strand Mat (GM-2)

A glass chopped strand mat (GM-2) with a thickness of 1.2 mm, a mat weight of 450 g/m$^2$ and an ignition loss of 2.64% (an ignition loss ratio of 91%) was obtained in the same manner as in Example 1, except that the binder (X-1) was replaced with the binder (X-2).

Example 3

Preparation of Glass Chopped Strand Mat (GM-3)

A glass chopped strand mat (GM-3) with a thickness of 1.2 mm, a mat weight of 450 g/m$^2$ and an ignition loss of 2.75% (an ignition loss ratio of 95%) was obtained in the same manner as in Example 1, except that the binder (X-1) was replaced with the binder (X-3).

Example 4

Preparation of Glass Chopped Strand Mat (GM-4)

A glass chopped strand mat (GM-4) with a thickness of 1.1 mm, a mat weight of 450 g/m² and an ignition loss of 2.65% (an ignition loss ratio of 91%) was obtained in the same manner as in Example 1, except that the glass strand (for glass chopped strands) was replaced with a glass strand with an average strand count T of 10 tex, a glass fiber density d of 2.5 g/cm³ and a strand diameter K of 71.4 µm and that the binder (X-1) was replaced with the binder (X-2).

Example 5

Preparation of Glass Chopped Strand Mat (GM-5)

A glass chopped strand mat (GM-5) with a thickness of 1.4 mm, a mat weight of 450 g/m² and an ignition loss of 2.76% (an ignition loss ratio of 95%) was obtained in the same manner as in Example 1, except that the glass strand (for glass chopped strands) was replaced with a glass strand with an average strand count T of 120 tex, a glass fiber density d of 2.5 g/cm³ and a strand diameter K of 247.2 µm and that the binder (X-1) was replaced with the binder (X-3).

Example 6

Preparation of Glass Chopped Strand Mat (GM-6)

A glass chopped strand mat (GM-6) with a thickness of 1.2 mm, a mat weight of 450 g/m² and an ignition loss of 2.81% (an ignition loss ratio of 97%) was obtained in the same manner as in Example 1, except that the binder (X-1) was replaced with the binder (X-4).

Example 7

Preparation of Glass Chopped Strand Mat (GM-7)

A glass chopped strand mat (GM-7) with a thickness of 1.2 mm, a mat weight of 450 g/m² and an ignition loss of 2.83% (an ignition loss ratio of 97%) was obtained in the same manner as in Example 1, except that the binder (X-1) was replaced with the binder (X-5).

Example 8

Preparation of Glass Chopped Strand Mat (GM-8)

The glass chopped strands and the binder were scattered in the same manner as in Example 1, except that the amount of the glass chopped strands per scattering was changed from 45.0 g to 5.0 g, 1.35 g of the binder (X-1) per scattering was replaced with 0.15 g of the binder (X-6) per scattering, and the process was performed three times, so that in total, 15.0 g of the glass chopped strands and 0.45 g of the binder (X-6), corresponding to 3.0% of the amount of the strands, were scattered in the same manner as in Example 1 to form a laminate of the glass chopped strands having a three-layer structure.

The laminate was then hot pressed in the same manner as in Example 1, so that a glass chopped strand mat (GM-8) with a thickness of 0.3 mm, a mat weight of 50 g/m² and an ignition loss of 2.62% by weight (an ignition loss ratio of 90%) was obtained.

Example 9

Preparation of Glass Chopped Strand Mat (GM-9)

The glass chopped strands and the binder were scattered as in Example 1, except that the amount of the glass chopped strands per scattering was changed from 45.0 g to 58.0 g, 1.35 g of the binder (X-1) per scattering was replaced with 1.74 g of the binder (X-7) per scattering, and the process was performed three times, so that in total, 174.0 g of the glass chopped strands and 5.22 g of the binder (X-7), corresponding to 3.0% of the amount of the strands, were scattered in the same manner as in Example 1 to form a laminate of the glass chopped strands having a three-layer structure.

The laminate was then hot pressed in the same manner as in Example 1, so that a glass chopped strand mat (GM-9) with a thickness of 1.6 mm, a mat weight of 580 g/m² and an ignition loss of 2.91% by weight (an ignition loss ratio of 100%) was obtained.

Comparative Example 1

Preparation of Glass Chopped Strand Mat (GM'-1)

A glass chopped strand mat (GM'-1) with a thickness of 1.2 mm, a mat weight of 450 g/m² and an ignition loss of 2.76% (an ignition loss ratio of 95%) was obtained in the same manner as in Example 1, except that the binder (X-1) was replaced with the binder (X'-1).

Comparative Example 2

Preparation of Glass Chopped Strand Mat (GM'-2)

A glass chopped strand mat (GM'-2) with a thickness of 1.2 mm, a mat weight of 450 g/m² and an ignition loss of 2.44% (an ignition loss ratio of 84%) was obtained in the same manner as in Example 1, except that the binder (X-1) was replaced with the binder (X'-2).

Comparative Example 3

Preparation of Glass Chopped Strand Mat (GM'-3)

A glass chopped strand mat (GM'-3) with a thickness of 1.2 mm, a mat weight of 450 g/m² and an ignition loss of 2.55% (an ignition loss ratio of 88%) was obtained in the same manner as in Example 1, except that the binder (X-1) was replaced with the binder (X'-3).

Comparative Example 4

Preparation of Glass Chopped Strand Mat (GM'-4)

A glass chopped strand mat (GM'-4) with a thickness of 1.1 mm, a mat weight of 450 g/m² and an ignition loss of 2.49% (an ignition loss ratio of 86%) was obtained in the same manner as in Example 1, except that the glass strand (for glass chopped strands) was replaced with a glass strand with an average strand count T of 10 tex, a glass fiber density d of 2.5 g/cm³ and a strand diameter K of 71.4 µm and that the binder (X-1) was replaced with the binder (X'-4).

Comparative Example 5

Preparation of Glass Chopped Strand Mat (GM'-5)

A glass chopped strand mat (GM'-5) with a thickness of 1.2 mm, a mat weight of 450 g/m² and an ignition loss of 2.73% (an ignition loss ratio of 94%) was obtained in the same manner as in Example 1, except that the binder (X-1) was replaced with the binder (X'-5).

Evaluation Items (1) Softening Point (° C.)

The softening point was measured according to JIS K 2207 "Petroleum Asphalt, 6.4 Softening Point Test Method (Ring and Ball Method)" using an automatic softening point tester [ASP-5 (equipment name) manufactured by Tanaka Scientific Ltd.].

(2) Glass Transition Temperature (Tg) (° C.)

The glass transition temperature was measured according to JIS K 7121 "Method for Measuring Transition Temperature of Plastics" using RDC-220 (equipment name) manufactured by Seiko Instruments Inc.

(3) Volume Average Particle Diameter ($D_V$) of Polyester Resin Powder and the Respective Contents (%) of Particles with Volume Based Particle Diameter of at least 300 μm and Particles with Volume Based Particle Diameter of at most 75 μm in All Particles The measurement was performed by the laser diffraction scattering method using Microtrack 9320HRA Particle Size Analyzer (equipment name) manufactured by NIKKISO CO., LTD.

(4) Coefficient ($C_V$) (%) of Variation of Volume Based Particle Diameter Distribution The coefficient ($C_V$) of variation is the value calculated from the formula below. The standard deviation and the volume average particle diameter ($D_V$) were determined by the laser diffraction scattering method using Microtrack 9320HRA Particle Size Analyzer.

Coefficient ($C_V$) of variation=[standard deviation/volume average particle diameter ($D_V$)]×100

(5) Ratio [Volume Average Particle Diameter ($D_V$)/Number Average Particle Diameter ($D_N$)]

Each of the ($D_V$) and ($D_N$) values was measured by the laser diffraction scattering method using Microtrack 9320HRA Particle Size Analyzer.

(6) Ignition Loss (% by weight)

The ignition loss is the value measured according to JIS R 3420 "General Methods for Testing Glass Fibers, 7.3.2 Ignition Loss" and indicates the content (% by weight) of the attached binder and the like other than the glass fibers based on the weight of the mat.

(7) Ignition Loss Ratio (%)

The ignition loss ratio is calculated from the following formula:

Ignition loss ratio (%)=[ignition loss (% by weight)/2.91]×100

(8) Tensile Strength (N) of Glass Chopped Strand Mat

Ten test pieces of 50 mm width×150 mm length were prepared by cutting each of the glass chopped strand mats (GM-1) to (GM-9) and (GM'-1) to (GM'-5) and subjected to the measurement according to JIS R 3420 "General Methods for Testing Glass Fibers, 7.4 Tensile Strength." Specifically, the procedure described below was performed.

The results are shown in Table 1.

(i) Each test piece is allowed to stand under the conditions of 25° C. and a humidity of 65% (the standard atmosphere defined in JIS K 7100).

(ii) Both longitudinal ends of the test piece are held by upper and lower clamps, respectively, and the distance between the clamps is adjusted to 100 mm.

(iii) A tensile test is performed at a pulling rate of 100 mm/minute using Autograph AGS-500D (equipment name) manufactured by Shimadzu Corporation, and the tensile strength is defined as the force required to break the test piece.

(9) Measurement of Bending Elastic Modulus (MPa) of Glass Chopped Strand Mat (Evaluation of Flexibility)

Ten test pieces of 20 mm width×100 mm length were prepared by cutting each of the glass chopped strand mats (GM-1) to (GM-9) and (GM'-1) to (GM'-5) and subjected to the measurement according to ASTM D256. The results are shown in Table 1.

Evaluation Criteria

[1] Average Tensile Strength

The average of the tensile strengths of the ten test pieces was calculated and evaluated according to the following criteria.

◯: more than 130 N
Δ: at least 70 N and less than 130 N
×: less than 70 N

[2] Difference between Maximum and Minimum of Tensile Strength

The difference between the maximum and minimum of the tensile strength was calculated with respect to the ten test pieces and evaluated according to the following criteria.

◯: less than 40 N
Δ: at least 40 N and less than 80 N
×: at least 80 N

[3] Tensile Strength per Ignition Loss

The average of the tensile strengths of the ten test pieces was divided by the ignition loss (% by weight), and the quotient was evaluated according to the following criteria.

◯: more than 50 N
Δ: at least 30 N and less than 50 N
×: less than 30 N

[4] Average Bending Elastic Modulus (Evaluation of Flexibility)

◯: less than $1.5\times10^{-3}$ MPa
Δ: at least $1.5\times10^{-3}$ MPa and less than $2.0\times10^{-3}$ MPa
×: at least $2.0\times10^{-3}$ MPa

TABLE 1

| | Example 1 | Example 2 | Example 3 | Example 4 | Example 5 | Example 6 | Example 7 | Example 8 | Example 9 | Comparative Example 1 | Comparative Example 2 | Comparative Example 3 | Comparative Example 4 | Comparative Example 5 |
|---|---|---|---|---|---|---|---|---|---|---|---|---|---|---|
| Polyester resin powder | A-1 | A-2 | A-3 | A-2 | A-3 | A-4 | A-5 | A-6 | A-7 | A-1 | A-2 | A-3 | A-4 | A-5 |
| Mw | 30,000 | 30,000 | 30,000 | 30,000 | 30,000 | 30,000 | 30,000 | 6,500 | 40,000 | 30,000 | 30,000 | 30,000 | 30,000 | 30,000 |
| Mn | 2,800 | 2,800 | 2,800 | 2,800 | 2,800 | 2,800 | 2,800 | 2,300 | 4,300 | 2,800 | 2,800 | 2,800 | 2,800 | 2,800 |
| Softening point (° C.) | 116 | 116 | 116 | 116 | 116 | 116 | 116 | 88 | 130 | 116 | 116 | 116 | 116 | 116 |
| Glass transition temperature (° C.) | 53 | 53 | 53 | 53 | 53 | 53 | 53 | 48 | 56 | 53 | 53 | 53 | 53 | 53 |
| Volume average particle diameter ($D_v$) (μm) | 185 | 249 | 109 | 249 | 109 | 158 | 193 | 180 | 188 | 123 | 340 | 229 | 302 | 86 |
| Content of particles of at least 300 μm (wt %) | 3 | 9 | 2 | 9 | 2 | 0 | 0 | 2 | 3 | 4 | 76 | 19 | 30 | 0 |
| Content of particles of at most 75 μm (wt %) | 0 | 0 | 19 | 0 | 19 | 0 | 0 | 0 | 0 | 42 | 1 | 5 | 0 | 9 |
| Coefficient ($C_v$) of variation (%) | 24 | 17 | 29 | 17 | 29 | 12 | 13 | 23 | 24 | 56 | 48 | 39 | 19 | 12 |
| $D_v/D_N$ | 1.2 | 1.1 | 1.5 | 1.1 | 1.5 | 1.0 | 1.0 | 1.2 | 1.2 | 2.9 | 3.0 | 2.8 | 1.1 | 1.0 |
| Glass chopped strand mat | GM-1 | GM-2 | GM-3 | GM-4 | GM-5 | GM-6 | GM-7 | GM-8 | GM-9 | GM-1 | GM-2 | GM-3 | GM-4 | GM-5 |
| $D_s/K$ | 1.5 | 2.0 | 0.9 | 3.5 | 0.4 | 1.3 | 1.6 | 1.5 | 1.5 | 1.0 | 2.8 | 1.9 | 4.2 | 0.7 |
| Binder | X-1 | X-2 | X-3 | X-2 | X-3 | X-4 | X-5 | X-6 | X-7 | X-1 | X-2 | X-3 | X-4 | X-5 |
| Ignition loss ratio (%) | 93 | 91 | 95 | 91 | 95 | 97 | 97 | 90 | 100 | 95 | 84 | 88 | 86 | 94 |
| Amount of bonded binder (%) | 2.8 | 2.7 | 2.8 | 2.7 | 2.8 | 2.9 | 2.9 | 2.7 | 3.0 | 2.8 | 2.5 | 2.6 | 2.6 | 2.8 |
| Mat weight (g/m²) | 463 | 462 | 463 | 462 | 463 | 463 | 463 | 51 | 597 | 463 | 461 | 462 | 462 | 463 |
| Tensile strength Average | ○ | ○ | ○ | ○ | ○ | ○ | ○ | ○ | ○ | △ | X | △ | X | △ |
| Difference between maximum and minimum | ○ | ○ | ○ | ○ | ○ | ○ | ○ | ○ | ○ | X | △ | △ | X | △ |
| Tensile strength per ignition loss | ○ | ○ | ○ | ○ | ○ | ○ | ○ | ○ | ○ | △ | X | △ | X | ○ |
| Bending elastic modulus | ○ | ○ | ○ | ○ | ○ | ○ | ○ | ○ | ○ | X | ○ | △ | ○ | △ |

It is apparent from Table 1 that the glass chopped strand mat of the invention has a high ignition loss ratio and thus shows high binder attaching efficiency as compared with conventional ones and that the strength (such as tensile strength) of the mat is high and uniform over the whole of the mat. It is necessary to supply an increased amount of the binder to the comparative mats with low strength. Therefore, it is also apparent that the binder of the invention can be used in an amount smaller than the conventional amount to impart the desired strength to the mat.

Table 1 also shows that the glass chopped strand mat of the invention has a moderate bending elastic modulus and high flexibility as compared with comparative examples. Therefore, it is apparent that when the mat of the invention is used to form a glass fiber reinforced plastic molded product, it can significantly contribute to an improvement in workability, because of its ability to fit into the molding die.

INDUSTRIAL APPLICABILITY

The glass chopped strand mat comprising a laminate of glass chopped strands bonded with the binder of the invention may be used as a reinforcement material to form glass fiber reinforced plastic molded products. Such molded products may be used in a wide field such as car components (e.g., roof molding materials), the body of a small ship (e.g., a canoe, a boat, a yacht, or a motorboat), and house components (e.g., a bathtub and a septic tank) and therefore are very useful.

The invention claimed is:

1. A glass chopped strand mat binder, comprising a polyester resin powder (A) having a volume average particle diameter $D_V$ of 100 to 250 μm, containing at most 20% by weight of particles with a volume based particle diameter of at least 300 μm, and having a coefficient $C_V$ of variation of volume based particle diameter distribution of 0.1 to 30% as measured by the laser diffraction scattering method.

2. The binder according to claim 1, wherein the powder (A) contains at most 20% by weight of particles having a volume based particle diameter of at most 75 μm.

3. The binder according to claim 1, wherein the powder (A) has a ratio $[D_V/D_N]$ of its volume average particle diameter $D_V$ to its number average particle diameter $D_N$ of 1 to 1.5.

4. The binder according to claim 1, wherein the powder (A) has a number average circularity of 0.8 to 1.0.

5. The binder according to claim 1, wherein the polyester resin is a polycondensation product of a polycarboxylic acid and an alkylene oxide adduct of a ring-containing, polyvalent hydroxyl group-containing compound.

6. The binder according to claim 1, wherein the polyester resin has a glass transition temperature (Tg) of 40 to 60° C. as measured by differential thermal analysis method.

7. The binder according to claim 1, wherein the polyester resin has an acid value of at most 20.

8. The binder according to claim 1, further comprising one or two or more additive (B) selected from the group consisting of an anti-blocking agent (B1), a lubricant (B2) and a hydrophilizing agent (B3).

9. The binder according to claim 8, wherein the additive (B) is used in a total amount of 0.01 to 5%, based on the weight of the polyester resin.

10. The binder according to claim 1, which has a ratio $[D_V/K]$ of its volume average particle diameter $D_V$ to a glass strand diameter K (μm) of 0.1 to 4, wherein the glass strand is for use in forming a glass chopped strand mat, and the diameter K is calculated from the following formula (1): $K=20\times[10T/(d\pi)]^{1/2}$, wherein K represents the glass strand diameter (μm), T represents the average strand count (tex) of the glass strand, d represents a glass fiber density (g/cm$^3$), and π represents the circular constant.

11. The binder according to claim 10, wherein the glass strand for use in forming a glass chopped strand mat has an average strand count of 10 to 150 tex.

12. A glass chopped strand mat, comprising a laminate of glass chopped strands bonded with the binder according to claim 1.

13. The mat according to claim 12, wherein the glass chopped strands have an average strand count of 10 to 150 tex.

14. The mat according to claim 12, wherein the binder is bonded in an amount of 1 to 30%, based on the weight of the laminate of the glass chopped strands.

15. The mat according to claim 12, which has a mat weight of 50 to 600 g/m$^2$.

16. The mat according to claim 12, which has an ignition loss ratio (% by weight) of at least 90%.

17. The mat according to claim 12, which has a difference of less than 40 N between its maximum tensile strength and its minimum tensile strength.

18. A glass fiber reinforced plastic product, comprising the mat according to claim 12 formed as a reinforcement material.

19. The glass fiber reinforced product according to claim 18, which is for use in a car roof forming material, a small ship body, a bathtub, or a septic tank.

20. A method for manufacturing a glass chopped strand mat, comprising:
scattering glass chopped strands, water and a binder to form a laminate of glass chopped strands;
and hot pressing the laminated strands to form the glass chopped strand mat, wherein the binder according to claim 1 is used.

* * * * *